US008555168B2

(12) United States Patent
Herpel et al.

(10) Patent No.: US 8,555,168 B2
(45) Date of Patent: *Oct. 8, 2013

(54) METHOD AND DEVICE FOR COMPOSING A MENU

(71) Applicant: Thomson Licensing, Issy de Moulineaux (FR)

(72) Inventors: Carsten Herpel, Wennigsen (DE); Jobst Hörentrup, Hannover (DE); Ralf Ostermann, Hannover (DE); Hartmut Peters, Barsinghausen (DE); Dirk Gandolph, Ronnenberg (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,833

(22) Filed: Dec. 4, 2012

(65) Prior Publication Data

US 2013/0097504 A1 Apr. 18, 2013

Related U.S. Application Data

(63) Continuation of application No. 10/578,996, filed as application No. PCT/EP2004/010234 on Sep. 13, 2004, now Pat. No. 8,359,536.

(30) Foreign Application Priority Data

Nov. 12, 2003 (EP) .................................... 03025926
Nov. 24, 2003 (EP) .................................... 03026859

(51) Int. Cl.
*G06F 3/00* (2006.01)
(52) U.S. Cl.
USPC ........................................................ 715/719

(58) Field of Classification Search
USPC .................. 715/719, 727, 811, 821, 825, 826
See application file for complete search history.

(56) References Cited

U.S. PATENT DOCUMENTS

| 5,929,857 | A | 7/1999 | Dinallo et al. |
| 6,553,180 | B1 | 4/2003 | Kikuchi et al. |
| 2003/0084460 | A1 | 5/2003 | Chung et al. |
| 2006/0031785 | A1 | 2/2006 | Raciborski |
| 2006/0181965 | A1 | 8/2006 | Collart |

FOREIGN PATENT DOCUMENTS

| EP | 1223504 | 7/1999 |
| JP | 11215466 | 8/1996 |
| JP | 2000132953 | 10/2000 |
| JP | 2002247526 | 8/2002 |
| JP | 2003507989 | 2/2003 |
| JP | 2003153140 | 5/2003 |
| JP | 2003216535 | 7/2003 |
| WO | 01/15168 | 3/2001 |
| WO | 01/35412 | 5/2001 |

*Primary Examiner* — Thanh Vu
(74) *Attorney, Agent, or Firm* — Robert D. Shedd; Vincent E. Duffy; Joel M. Fogelson

(57) ABSTRACT

Multimedia content of exchangeable storage media, such as optical discs, may be extended by bonus content that is downloaded via Internet connection and stored on a local storage device. An improved method for integration of different menu items relating to on-disc content and downloaded content provides flexibility and a simple, low cost solution. The method for integration of downloaded bonus content into a menu comprises defining one or more placeholders within a menu, determining a storage location or naming convention for bonus content, declaring for each placeholder an attribute providing a unique association to a specific type of bonus content, providing a button image, detecting presence of bonus content data, replacing the associated placeholder by the associated button image and enabling an associated action to be taken when said button is selected.

1 Claim, 4 Drawing Sheets

METHOD AND DEVICE FOR COMPOSING A MENU

This application is a continuation of U.S. patent application Ser. No. 10/578,966, filed on May 11, 2006 which claims the benefit of International Application PCT/EP2004/010234, filed Sep. 13, 2004 and which claims the benefit of European patent applications No. EP03025926.1, filed on Nov. 12, 2003 and EP03026859.3, filed on Nov. 24, 2003. This application is also cross-referenced with Ser. No. 13/693,819 filed Dec. 4, 2012.

FIELD OF THE INVENTION

This invention relates to a method and device for composing an electronic audio-visual menu.

BACKGROUND

Devices for playback of multimedia content retrieved from a pre-recorded exchangeable storage medium, which is today usually an optical disc, may provide the ability to store additional content pertaining to a specific exchangeable storage medium. An example is a DVD player with integrated hard disc drive (HDD). Additional content can be downloaded from the Internet or retrieved from another exchangeable storage medium in order to upgrade the content, even after a customer has acquired a pre-recorded disc. Examples for such additional content are bonus tracks, subtitles in specific languages, advertisement trailer updates or games related to a movie. Such functionality usually requires a relatively expensive fully programmable device platform, e.g. a set of Java™ programs such as Java 2 MicroEdition (J2ME).

A playback system that contains such a completely programmable environment can detect additional content items and visualize them in the user interface by Java™ programs that can both be pre-authored at disc creation time or downloaded together with the bonus content items.

Today's multimedia storage systems allow mainly for audio, video, still images, graphical and control information as part of the multimedia content. Typically, a storage medium also contains a menu that is presented to the user on screen and that consists of a graphical layout comprising still images, audio and possibly video information. Such menus feature buttons or "hot spots" that can be navigated to and selected by the user through a remote control. The action to be taken when a menu button is pressed may be part of said control information. In current DVD player devices the mentioned functionality is realized by device firmware and the control information cannot be adapted to additional content either by the content author or the user of the device.

The existence and nature of the additional content that is added to the overall presentation is usually not known at the time when a pre-recorded storage medium is authored. Later, additional content items may be available for playback and must be navigated to by the user with a menu. For presenting these additional content items in a menu to the user anyway, known solutions are based on downloading both additional content and a complete menu, including the additional content items.

Further, menus for PC software often use visible but inactive, so-called "greyed-out" buttons that become active as soon as the associated content item is available. In this case the appearance and location of the respective button is predefined.

SUMMARY OF THE INVENTION

When an exchangeable pre-recorded storage medium for audio-visual content is authored, its menu would not initially contain buttons that are actually trying to trigger the playback of bonus content, since the bonus content would not itself be part of the disc content. It may not even be known at disc creation time what kind of bonus content might become available later. However, a simple and therefore cheap method for updating the described type of menus is desirable.

The problem to be solved by the invention is to provide a simplified method for adapting a menu that relates to an exchangeable storage medium, when the multimedia content of the storage medium is expanded by related multimedia content from other sources.

According to the invention, the method for automatically composing an electronic audio-visual menu for selection of audio-visual data, wherein a first portion of audio-visual data and a first portion of menu data is retrieved from an exchangeable storage medium, and wherein a related second portion of audio-visual data and a second portion of menu data may be obtained from a second data source, comprises that the menu that is generated from the first portion of menu data contains one or more visible, selectable buttons and at least one invisible placeholder that cannot be selected, and the first menu data contains one or more attributes associated with the placeholder. Further, the method comprises automatically detecting if said second portion of menu data is available, extracting an attribute that is associated with the second portion of menu data, and comparing it with an attribute associated with the placeholder. Finally, based on said comparison the placeholder is replaced with a visible and selectable button defined by the second portion of menu data if the attributes match.

The menu buttons are usable for presenting content selection choices to the user. A specific location or naming convention for later-to-be-added bonus content items may be predetermined when the medium is authored, so that a unique association can be made between a specific bonus content item and one of the placeholders, wherein such association is declared as an attribute of a placeholder. This enables an easy integration of downloaded bonus content into the menu.

For providing a button image that represents the downloaded bonus content in a graphical way and that can be downloaded together with said bonus content, the inventive method comprises identifying automatically the presence or absence of any related bonus content and—in case of its presence—determining which placeholder is appropriate, replacing the appropriate placeholder with a button represented by the associated button image, and enabling an associated action to be taken when said button is selected and pressed by the user.

The action that is associated with such a button may be described already together with the placeholder, e.g. the placeholder description contains the command "play PlayList BonusA", wherein "BonusA" is a playlist not initially present on the medium. The action may also be described as part of the downloaded bonus content item and associated to the menu button together with the downloaded button image.

Thus, from a user perspective the full required functionality is provided, namely the ability to present downloadable content in a menu, additionally to the pre-recorded multimedia content of an exchangeable medium, e.g. DVD. This functionality comprises performing the actual download of content and menu related data, managing downloaded content and making the existence of downloaded content visible to the user of said exchangeable medium.

A playback device that incorporates the inventive method is a device for generating audio-visual representation data and a related audio-visual menu containing buttons for selecting portions of the audio-visual representation, and comprises means for retrieving a first portion of audio-visual data and a first portion of menu data from an exchangeable storage medium, means for retrieving a second portion of audiovisual data and a second portion of menu data from a second data source, means for detecting if the first portion of menu data contains data for a placeholder or a first attribute specifying a placeholder, means for detecting if the second portion of menu data contains data for replacing a placeholder, means for extracting from the second portion of menu data a second attribute specifying which placeholder to replace, means for comparing the first and the second attribute specifying the placeholder to replace, and means for generating data for the function and for a visible representation of a menu button based on said comparison.

Advantageously, the inventive method does not require a fully programmable device platform, such as a PC, to be available. More specifically, the proposed very simple and cheap platform is sufficient, being pre-programmed by the device manufacturer rather than being programmable by the content author.

Further, the inventive method consumes less download bandwidth than known methods for menu update do, e.g. as compared to a mechanism for replacing the complete menu with a new menu, possibly consisting of large still images.

Another advantage of the inventive method is that there is no confusion which menu to select if multiple optional downloads exist for a given disc and only some of them are actually downloaded to a player. Even with multiple additional bonus content items a complete, correct menu can be generated, while for multiple downloaded menus the question is which of the downloaded menus should be used instead of the original menu.

A further advantage of the invention is that a menu with pre-authored button placement is easier to handle for content authors because of its universal approach, and therefore reduced flexibility due to stronger constraints for the download, management and presentation processes. This leads e.g. to an easier production of the menu data on the medium. Moreover, the content provider or author has the possibility to design the overall appearance of the menu in a consistent manner already at the time when the disc is authored. Thus, the menu looks complete although the graphical representation of the button, the "button image", is not known before the actual bonus content is being created. This provides new artistic possibilities and freedom to the author, e.g. consistent design of menus, positioning of buttons before they exist, and adapting the bonus content button image design to the actual bonus content item at any time.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an exemplary file system structure of a pre-recorded optical disc.

DETAILED DESCRIPTION OF THE INVENTION

Figure 1:
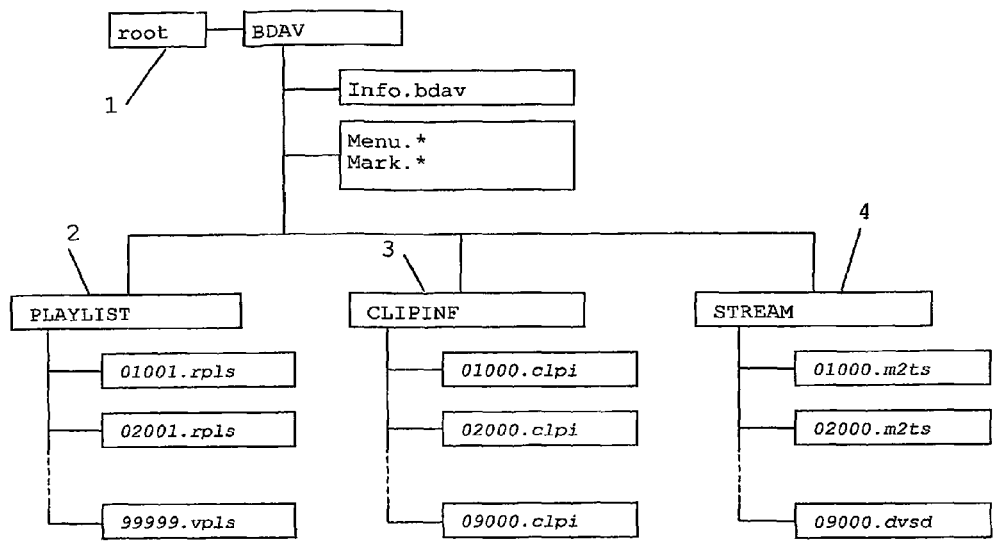

Exchangeable mass storage media for distribution of movies or other AV contents may use a directory structure as shown exemplarily for Blu-ray discs (BD) in FIG. 1. In a common root directory 1 is a branch, or folder, for BD audiovisual data BDAV, which in turn has subfolders for playlists 2, clip related information CLIPINF 3 and for the actual AV streams STREAM 4. Each subfolder contains one or more files. For this type, and other types, of advanced exchangeable storage systems the content not only consists of the multimedia entertainment material on the medium, but it may also be possible to download additional, so-called bonus content from the Internet or another exchangeable storage medium and store it on a local storage device, e.g. hard disk drive (HDD), or alternatively download bonus content at presentation time.

Figure 2:
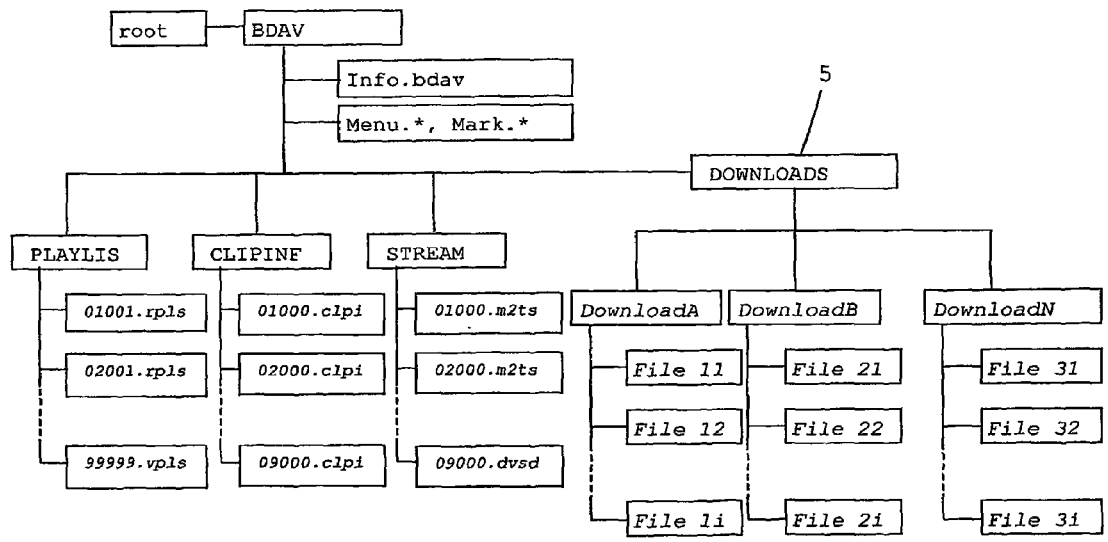
FIG. 2 a file system structure including a separate branch for downloaded bonus content.

FIG. 2 shows the directory structure of an according to the invention enhanced type of pre-recorded BD, with an additional branch DOWNLOADS 5 for additional or bonus data relating to the contents of the disc. At disc creation time, only the names of the folder DOWNLOADS 5 and its subfolders are determined The folders may be empty or contain empty files with predefined names. The file system branch for downloaded data DOWNLOADS 5 and its subfolders DownloadA, DownloadB, DownloadN can either be on-disc, if the disc contains a recordable portion, or otherwise on a separate storage device, e.g. HDD within the player. In the latter case the DOWNLOAD branch for a specific disc is logically connected to the disc file system as soon as that disc is inserted and ready for playback. For simplicity, the figures show a merged view of original file system structure on the pre-recorded disc plus the download branch.

Advantageously, the invention provides a low cost solution compared with a fully programmable solution such as a Java™ Virtual Machine. According to the invention, only very low-level code needs to be executed to convert an invisible button to a visible button under the condition that some bonus content becomes available, e.g. downloaded from the Internet. Such code does not require a high-level programming language such as e.g. Java™ or a fully programmable environment such as a PC, but can be a simple state machine based on firmware code. The function needed to determine the state of, for example, "DownloadA present" may be realized as a directory read request, counting the number of files within said directory, with any number greater than e.g. 1 indicating that this specific download is indeed present. Such a directory read request is usually part of a player firmware anyway. When the download data are present, an appropriate placeholder is selected, replaced by a button and the button is activated, as described above.

Another advantage of the invention is that the menu can be designed so that for the users perception there is no difference between menu items of on-disc and downloaded content. Additional menu items for additional content that is available for playback can be seamlessly integrated into the pre-recorded menu.

Figure 3:
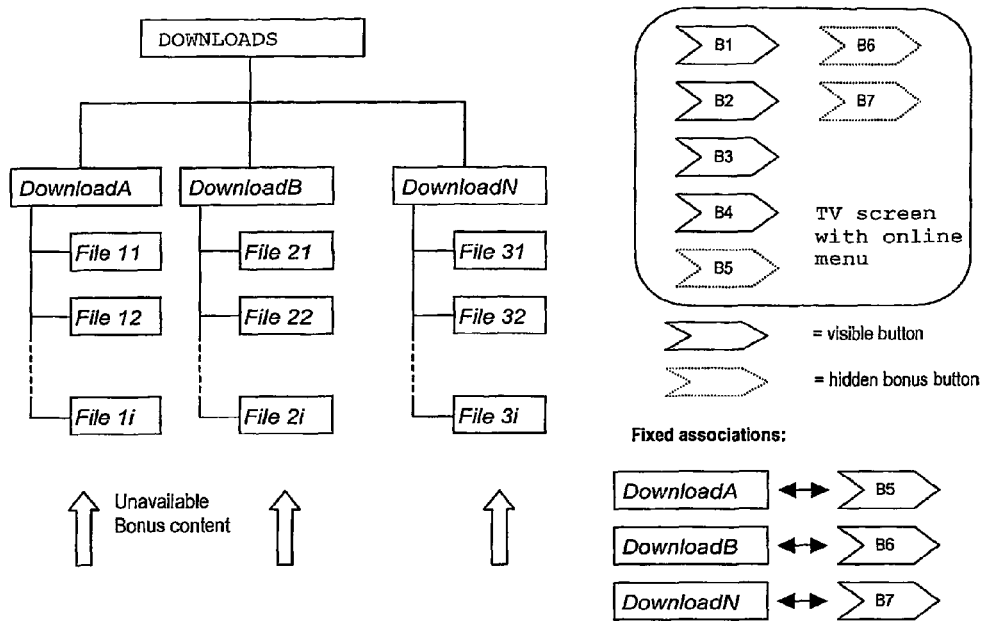
FIG. 3 the structure of subfolders for additional content and associated menu buttons.

FIG. 3-6 show an embodiment of the invention, and how it may be presented on a screen. As long as no bonus content is available, only the pre-authored original buttons B1, . . . , B4 are visible on a TV screen with online menu. This is depicted in FIG. 3. For buttons relating to unavailable bonus contents, however, there are already locations B5, . . . , B7 defined, but the actual bonus buttons are hidden. Though the bonus buttons are shown in FIG. 3-8 for clarity, their shapes or positions are not visible on a screen. There are also fixed associations defined, by associating a first folder DownloadA for bonus content with a first button B5, a second folder DownloadB for bonus content with a second button B6, and a third folder DownloadN with a third button B7.

Figure 4:
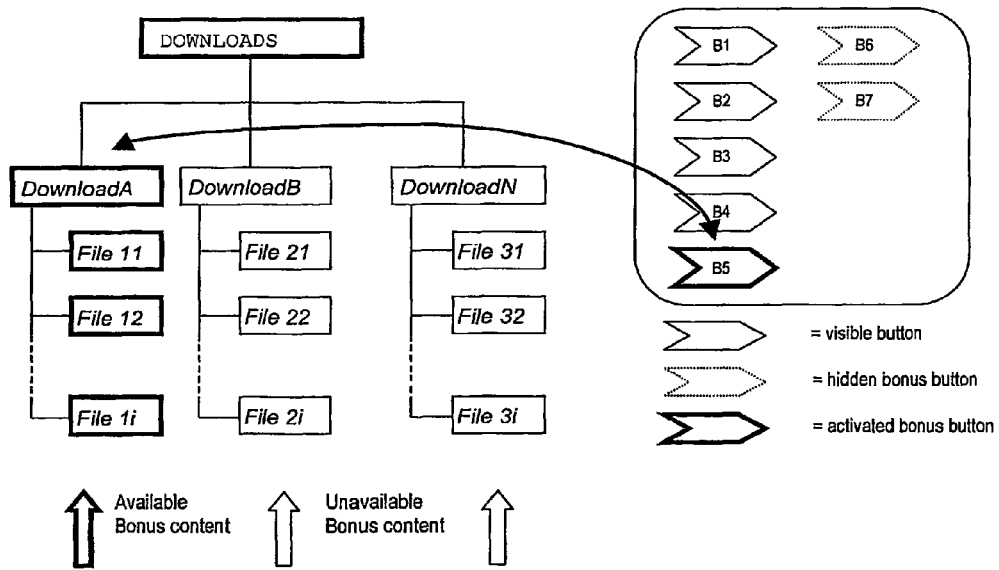
FIG. 4 selection and activation of a bonus button associated with a first download subfolder containing bonus content.

FIG. 4 shows the situation when a first bonus content was downloaded from the Internet or otherwise made available. As an example, it may be background information related to a movie on a disc. The bonus content comprises menu data including an attribute, e.g. "FolderName", which has the value "DownloadA". Therefore all files relating to the bonus content are stored in the folder named "DownloadA", which in turn is associated to the first button placeholder B5. Therefore this button becomes activated and visible. Its position, its appearance or both may be pre-defined, e.g. if the general type of bonus content is known at disc creation time, or may be defined by data contained in the downloaded data. Other types of unique reference between the bonus data set, a folder and a particular button placeholder are possible as well, e.g. the bonus data set may contain an attribute that directly points to a button placeholder, or a label that matches the label of a folder, or the folders have a priority and are used in the order of their priority.

Figure 5:
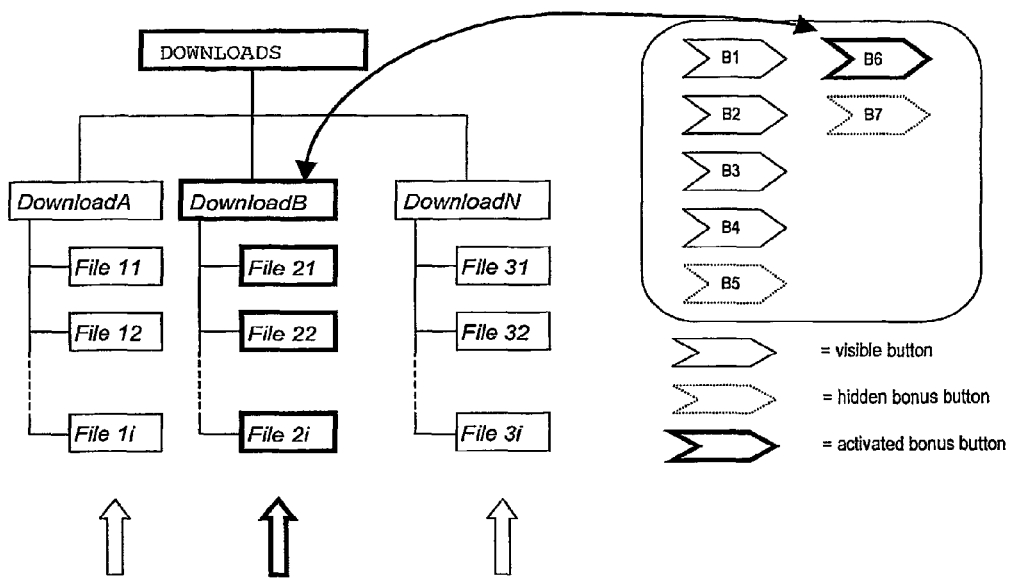
FIG. 5 selection and activation of a bonus button associated with another download subfolder containing bonus content.

FIG. 5 shows a situation where another type of bonus content data was downloaded, e.g. a trailer for a new movie. In this case, the attribute "FolderName", which is included in the bonus content, has the value "DownloadB". Therefore all files File21, . . . , File2i relating to the bonus content are stored in the folder named "DownloadB", which is associated to the second button placeholder B6. Therefore this button is activated and visible, with its position and appearance being defined as described before.

Figure 6:
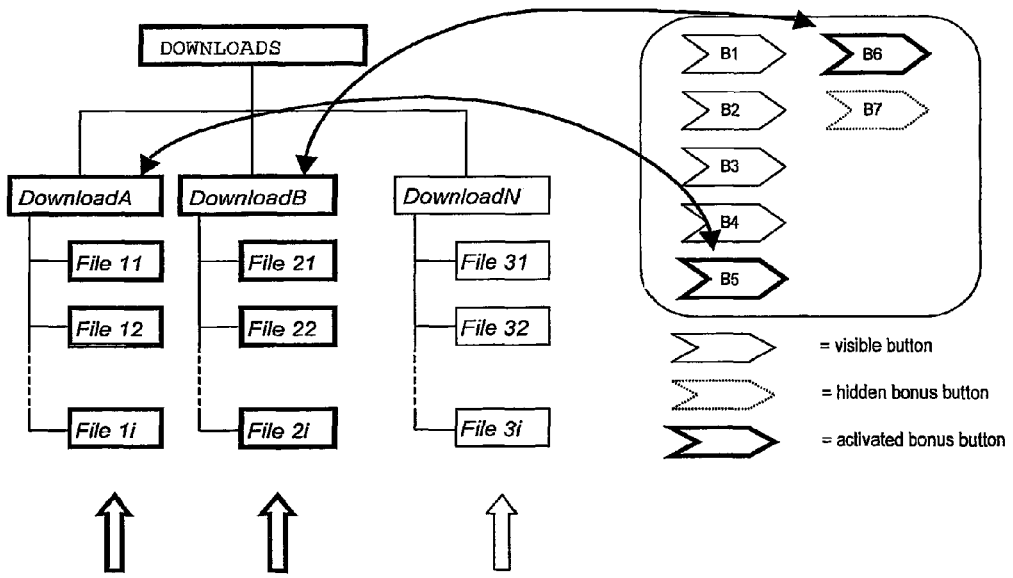
FIG. 6 selection and activation of two bonus buttons associated with two different download folders, both of which containing bonus content.

A combination of the two cases is shown in FIG. 6. Both types of content are available simultaneously and stored in the respective folders DownloadA,DownloadB. Accordingly, both bonus buttons B5,B6 are visible, activated and selectable.

Figure 7:
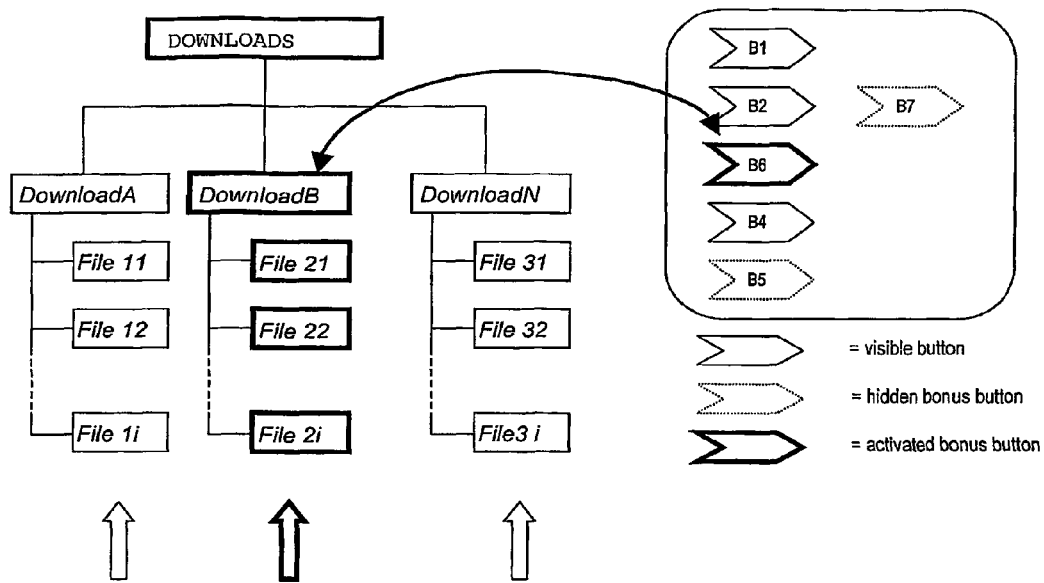
FIG. 7 replacement of an original menu button with an activated bonus button.

FIG. 7 shows an embodiment of the invention where the position of a bonus button B6 is defined to be identical to the position of a pre-existing button, so that the bonus button B6 is visible and activated while the pre-existing button is deleted. E.g. the data defining the bonus button may contain a position attribute that overwrites the buttons default position, or an attribute defining which other pre-existing button to overwrite. This can be used when pre-recorded content becomes obsolete, e.g. a downloaded advertisement trailer for a new movie replaces a pre-recorded advertisement trailer for a movie. Downloaded bonus content however may be replaced by other bonus content if it is stored on a rewritable medium and this feature is permitted. When downloaded content is deleted, the respective menu button disappears and the placeholder is used again.

Figure 8:
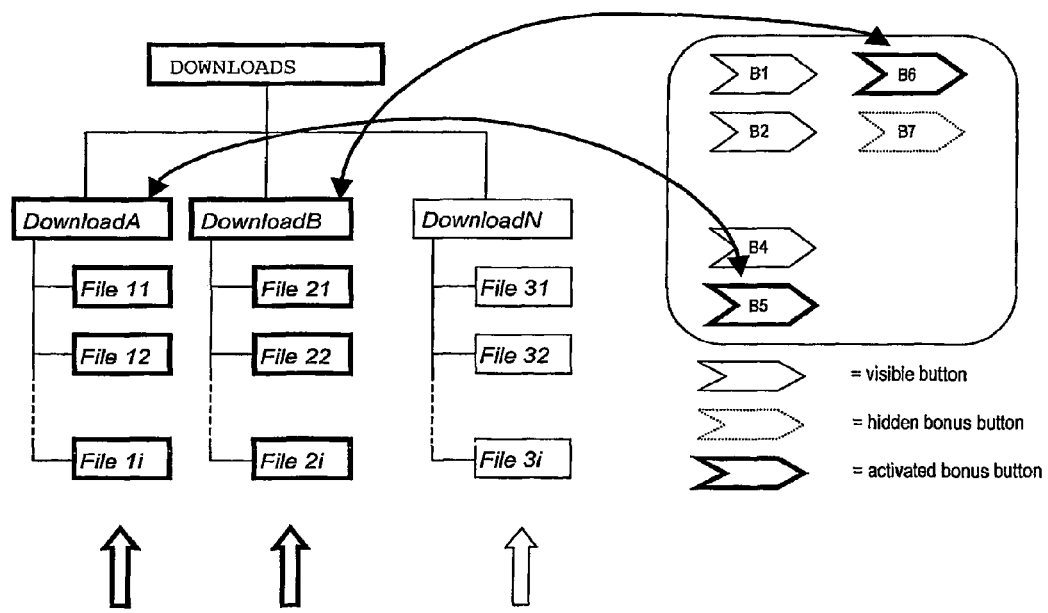
FIG. 8 two buttons relating to bonus content being activated pre-authored hidden bonus buttons, and an original menu button being disabled and invisible.

Further, the existence of bonus content may also modify the menu such that one or more pre-existing buttons are deleted, e.g. buttons that are obsolete. This is depicted in FIG. 8, where e.g. the coexistence of bonus content data in DownloadA and DownloadB leads to visible display and activation of two buttons B5 and B6 as described above, while deactivating and hiding one of the pre-existing buttons B3.

An advantage of the invention is that the author of such menu can anticipate at disc creation time the future existence of one or more bonus content items, and can adjust the graphical layout of the menu with respect to its artistic appearance in such a way that the menu is artistically acceptable both without and with the associated one or more buttons indicating the presence of additional bonus content items.

One aspect of this invention is that for specific button placeholders within a menu layout a fixed association is declared with certain files with pre-determined names or certain folder of the disc file system with pre-determined folder names. For example, the fixed association between a particular folder DownloadA and a particular button place-holder B5, as described above, could be realized by first agreeing when designing the overall system that always subfolders of "root/BDAV/DOWNLOADS/" shall contain the downloaded bonus content items, and then making the string describing the subfolder, e.g. "DownloadA", part of the placeholder data for a button. Alternatively, subfolders might be simply enumerated rather than named by strings. The desired numeral 1, 2, 3 . . . may then be part of the placeholder.

In one embodiment of the invention, a button placeholder consists of button location information, information to which download subfolder this placeholder is associated and information which action is to be taken when the button is pressed after it was activated. For an easy implementation, the file names of the button images to be positioned at the location of the respective placeholders can be decided at design time of the system, for example it may be agreed that they must always be named "ButtonImage.jpg" and positioned within the associated download folder, i.e. the files are "/root/BDAV/Downloads/DownloadA/ButtonImage.jpg" and "/root/BDAV/Downloads/DownloadB/ButtonImage.jpg" for DownloadA and DownloadB respectively. As an example, the conditions under which the invisible placeholders of buttons become visible by changing them to the downloaded button image are listed in the state table Tab.1. Each of two buttons B5 and B6 is only visible when download data with a corresponding label DownloadA or DownloadB are available. The process of actually reading the images and placing them in the menu can be executed by the player firmware.

TABLE 1

Exemplary conditions for usage of bonus buttons

| DownloadA present | DownloadB present | B5 | B6 |
|---|---|---|---|
| no | No | invisible | invisible |
| yes | No | visible | invisible |
| No | Yes | invisible | visible |
| Yes | yes | visible | visible |

Furthermore, buttons in a menu need a definition of what happens when the "UP", "DOWN", "LEFT", or "RIGHT" keys on the remote control are pressed. This is called chaining. If at a certain location a placeholder rather than a button is present, the navigation behaviour should reflect this. This can be described with reference to FIG. 3. If a button B5 is only present as a placeholder, and thus is invisible and inactive, and when currently the last regular button B4 is highlighted and therefore selected, then the next selected button after pressing the "DOWN" key may not be the invisible, inactive button B5. Depending on the design of the user interface, instead it should be either the same button B4 again or, as much more common in user interfaces, the first button B1. When a bonus content item is downloaded into the folder labelled "DownloadA", as shown in FIG. 4, the—now active—button B5 would be selected when the button B4 is highlighted and the "DOWN" key is pressed on a remote control. The necessary changes in the chaining of buttons for navigation depending on whether "DownladA" or "DownloadB" or both are present are exemplarily described in Tab.2. E.g., if data in DownloadB are present, the third data line of Tab.2 is relevant. If the B4 button is currently selected and the "Down" button is pressed on the remote control, the fourth column is relevant, so that the next selected button is B6.

TABLE 2

Chaining of buttons for "Up" and "Down" commands

| Download A present | Download B present | B4 and „Up" | B4 and „Down" | B5 and „Up" | B5 and „Down" | B6 and „Up" | B6 and „Down" | B1 and „Up" | B1 and „Down" |
|---|---|---|---|---|---|---|---|---|---|
| 0 | 0 | B3 | B1 | — | — | — | — | B4 | B2 |
| 1 | 0 | B3 | B5 | B4 | B1 | — | — | B5 | B2 |
| 0 | 1 | B3 | B6 | — | — | B4 | B1 | B6 | B2 |
| 1 | 1 | B3 | B5 | B4 | B6 | B5 | B1 | B6 | B2 |

The changes necessary for chaining buttons when pressing "LEFT" or "RIGHT" on the remote control may be done in a similar manner and are omitted here for brevity.

It is an advantage of the invention that it is very simple to implement. Each button placeholder defines the location of a single, later to be activated button and describes under which conditions it can be activated. In order to increase flexibility, again without necessity for high level programming, it is advantageous to send as part of the download information not only the button image of the new button to be activated, but also additional configuration information for determining whether other, pre-existing buttons are to be hidden and disabled, and how the location of the new button on the menu shall be. Hence, downloading a bonus content item may allow modification of the layout of buttons for the menu without actually reloading all of the graphical components of said menu.

In one embodiment of the invention, the inventive method for composing a menu that presents content selection choices to a user comprises the following steps: one or more placeholders for a button are defined within the menu data stored on an exchangeable storage medium, and a pre-defined location or naming convention for later-to-be-downloaded bonus content items is determined so that a unique association can be made between a specific bonus content item and one of the placeholders, wherein the association is declared as attribute of said placeholder, and a button image representing in a graphical way the bonus content item and being downloaded together with said bonus content item is provided. Furthermore, configuration information is provided for the placement of the respective button replacing said placeholder, as well as for the navigation chaining of said button to other pre-existing or bonus buttons, with this configuration information being downloaded together with said bonus content item. During playback of the contents retrieved from the storage medium, the presence or absence of any of said bonus content items on another data source, e.g. HDD, is identified and—in case of its presence—the associated placeholder is replaced with the associated button image, potentially including a repositioning of said button according to said configuration information. Applying of said downloaded button configuration may lead to the insertion of additional button objects downloaded as part of said bonus content item, and/or to omission of button objects previously available in the menu. The inventive method enables an associated action to be taken when said button is selected by the user, with said action being described either already together with the placeholder, e.g. "play PlayList BonusA", with "BonusA" being a playlist not present on disc initially, or being described as part of the downloaded bonus content item and bound to the menu together with the downloaded button image.

While the proposed invention does not offer the flexibility of a fully programmable approach, where such menu design choices can be made only when a specific bonus content item is created, it allows from the user perspective a similar feature, namely seamless presentation of downloaded content choices together with on-disc content choices, while being much less costly to implement and still leaving the artistic design choices with the disc creator.

A storage medium according to the invention contains menu data for presenting content selection choices to the user, and within the menu data one or more pre-defined placeholders for one or more buttons. Further, there is a pre-defined location or naming convention defined for later-to-be-downloaded bonus content items, so that a unique association can be made between a specific bonus content item and one of the placeholders. This association is declared as attribute of said placeholder. Button image data representing in a graphical way the bonus content item may be downloaded together with the actual bonus content.

In one embodiment of the invention a playback device may determine that any of said bonus content items is present, and thereupon replace the placeholder for a button with the associated button image and enable an associated action to be taken when said button is selected by the user. Said action may be described either already together with the placeholder, or it may be described as part of the downloaded bonus content item and associated to the menu together with the downloaded button image.

The size of a button, or the distance between buttons may vary, depending on the total numbers of visible buttons.

The invention can be applied for menus on all types of storage media. It is particularly advantageous for pre-recorded exchangeable media, such as Blu-ray discs or DVDs, and playback devices with access to additional storage capabilities, such as a HDD or Internet connection.

The invention claimed is:

1. A device for automatically composing an audio-visual menu for selection of playback of audio-visual data, the menu containing buttons for selecting portions of the audio-visual data, wherein a first portion of audio-visual data and a first portion of menu data are retrieved from a first storage medium being an exchangeable pre-recorded storage medium, and wherein a second portion of audio-visual data and a second portion of menu data are obtained from a second data source and has at least one first attribute associated, the device comprising means for generating an initial menu from the first portion of menu data, wherein the first portion of menu data comprises audio-visual data, the initial menu containing one or more visible, selectable buttons and at least one invisible placeholder that cannot be selected, wherein the placeholder has at least one second attribute associated;

means for extracting said first attribute associated with the second portion of menu data;

means for comparing said extracted first attribute with the second attribute associated with the placeholder, and for indicating that both attributes match; and means for replacing upon said indication the placeholder in said initial menu with a visible and selectable menu button;

wherein the second data source is different from said first storage medium and wherein a data obtained from said second data source are logically connected to a file system of a data from the first storage medium, and wherein said second portion of audio-visual data comprises no menu data, and said second portion of menu data comprises audio-visual menu data, and said second portion of menu data comprises audio-visual menu data and navigation chaining information, wherein navigation chaining information defines a button to be selected next upon a user input of one of "UP", "DOWN", "LEFT" and "RIGHT" keys on a remote control.

* * * * *